INVENTOR
CARL JOHN HEFFELFINGER

BY Claude L. Beaudoin
ATTORNEY

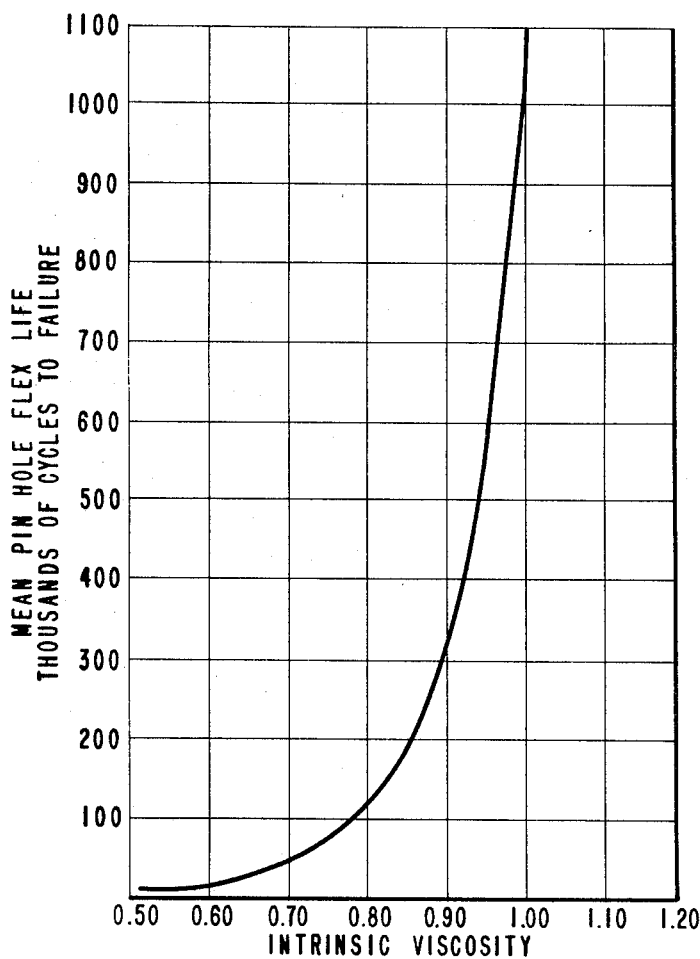
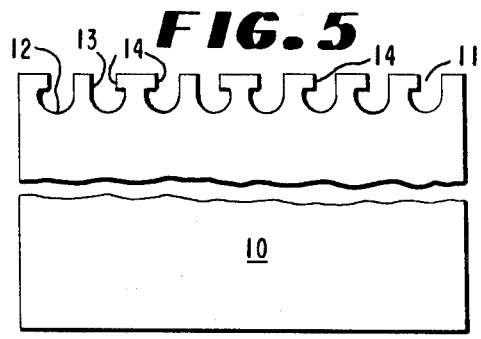

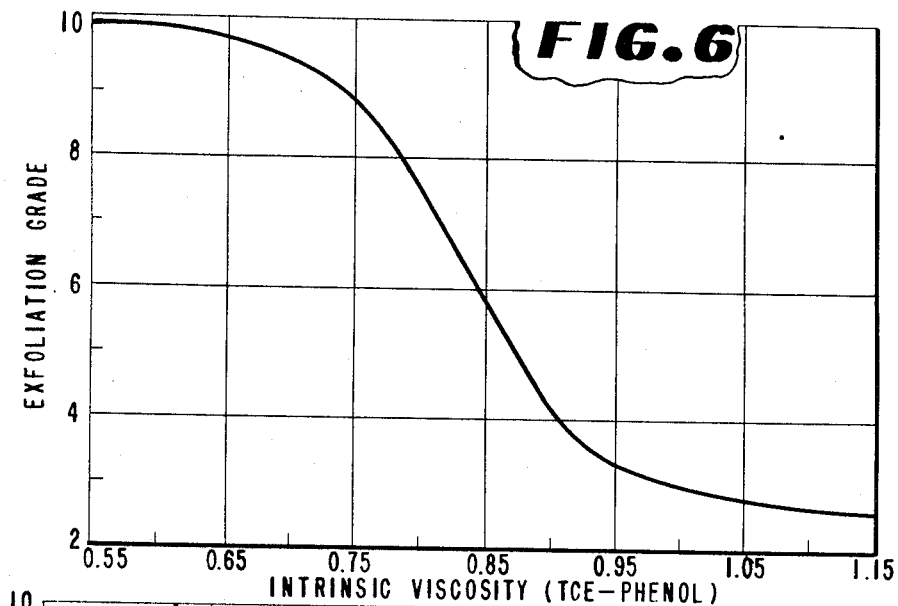
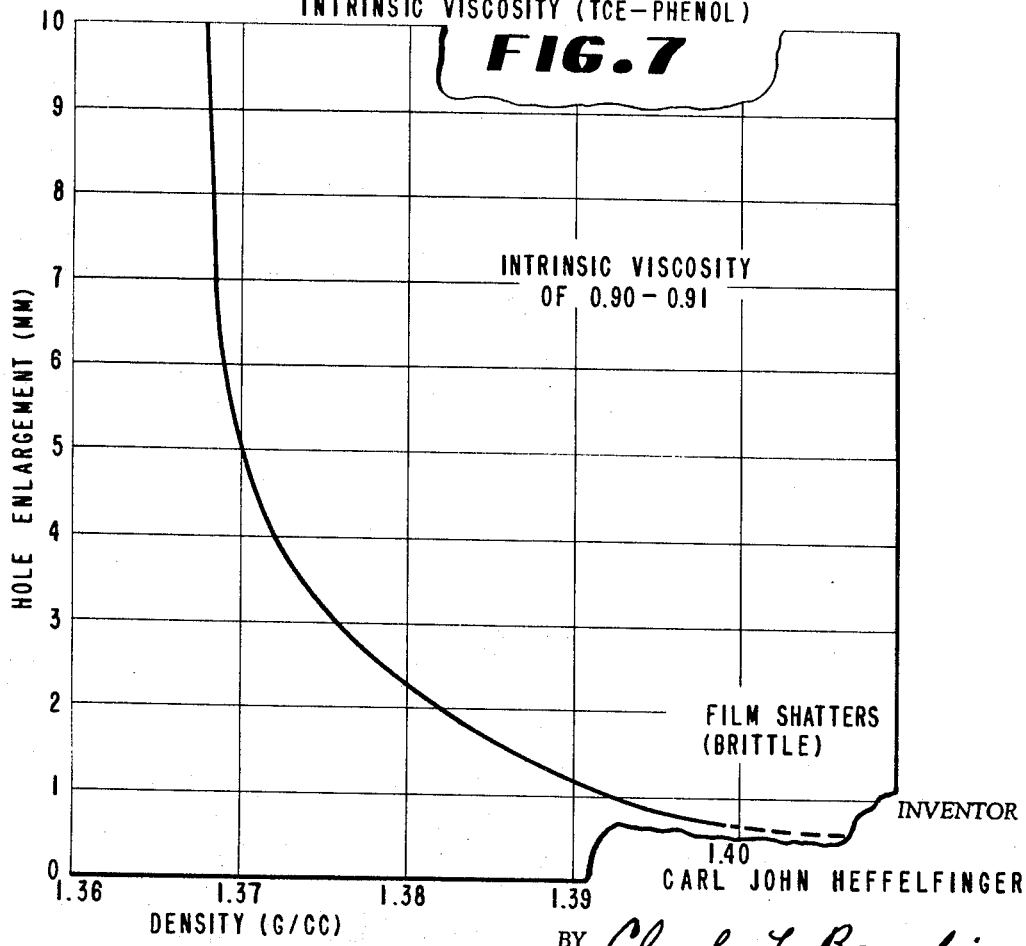
INVENTOR
CARL JOHN HEFFELFINGER
BY Claude L. Beaudoin
ATTORNEY

United States Patent Office 3,432,591
Patented Mar. 11, 1969

3,432,591
BIAXIALLY ORIENTED HEAT SET FILM OF HIGH MOLECULAR WEIGHT POLYETHYLENE TEREPHTHALATE
Carl John Heffelfinger, Circleville, Ohio, assignor to E. I. du Pont de Nemours and Company, Wilmington, Del., a corporation of Delaware
Continuation-in-part of application Ser. No. 373,574, June 8, 1964. This application Oct. 21, 1966, Ser. No. 588,588
U.S. Cl. 264—289  3 Claims
Int. Cl. B29d 17/02; C08g 17/04

ABSTRACT OF THE DISCLOSURE

A durable self-supporting film structure of polyethylene terephthalate is provided which is biaxially oriented, heat-set having an intrinsic viscosity greater than 0.82 and a density between about 1.370 and about 1.400.

---

The present application is a continuation-in-part of copending application Ser. No. 373,574, filed June 8, 1964, now abandoned.

The present invention relates to a novel film structure of thermoplastic polyester polymeric material and, more particularly, is directed to a novel film structure of biaxially oriented polyethylene terephthalate characterized by markedly improved toughness and durability and a greater retention of toughness over a broad temperature range.

It has been reported heretofore that polyethylene terephthalate with an intrinsic viscosity (an accepted measure of average molecular weight) of up to 1.2 is suitable for preparing film structures, but there is no disclosure that biaxially oriented, heat-set films of an intrinsic viscosity of over 0.75 have been made. Present day commercial films of polyethylene terephthalate are confined or limited to those having intrinsic viscosities of approximately 0.60 or less.

Notwithstanding the acceptance of known polyethylene terephthalate films, there are some uses and applications which the prior art film structures cannot adequately fulfill since these are limited by deficiencies in other film properties. For example, the rapid technological development in such fields as data processing, in which polyethylene terephthalate film structures are utilized as the base or support for magnetic memory elements, require films of great toughness and durability which cannot be satisfied by the presently available films.

Accordingly, it is the principal object of the present invention to provide polyethylene terephthalate film structures of superior toughness and durability characterized especially by a high resistance to delamination which causes exfoliation and chipping and having a high resistance to perforation upon repeated flexing, as well as retaining a high degree of toughness at elevated and cryogenic temperatures and under adverse environmental conditions.

According to the present invention, there is provided a biaxially oriented and crystallized polyethylene terephthalate film structure having an intrinsic viscosity greater than about 0.82, with a well-defined range of orientation and crystallinity. The film structure of the invention is characterized by being resistant to exfoliation, having enhanced pinhole flex life, and a broad temperature range of durability.

The film structures of the invention are composed of polyethylene terephthalate containing no more than minor amounts of other ester-forming components, i.e., they are composed of polymer of at least 95%, preferably at least 97% ethylene terephthalate repeating units of the formula:

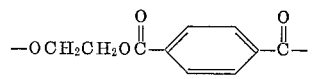

Figure 1:
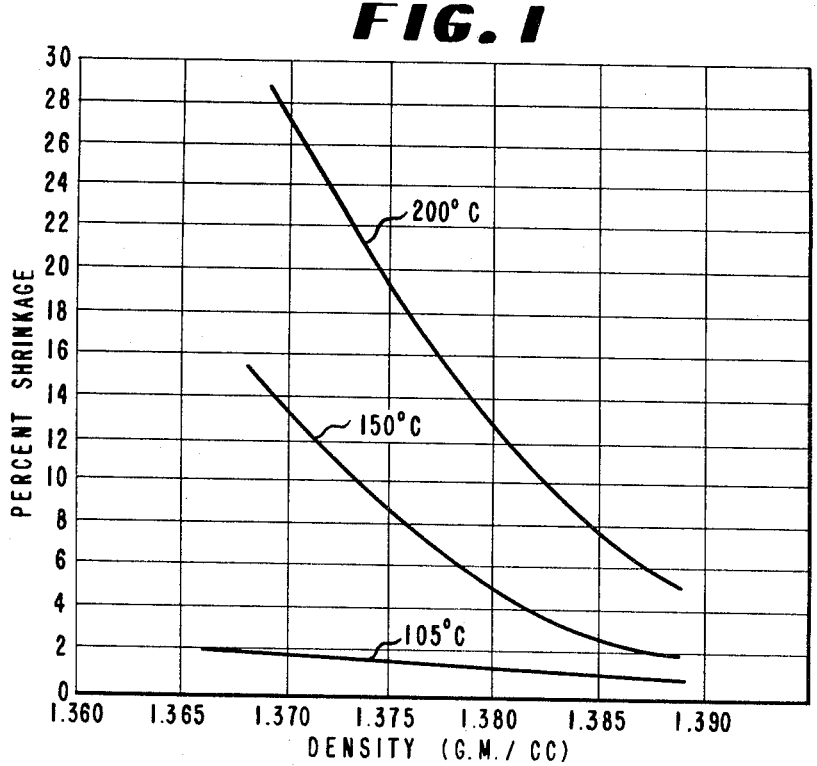

The nature and advantages of the film structure of the present invention will be more clearly understood by the following description and the several figures illustrated in the accompanying drawings in which:

FIGURE 1 graphically illustrates the shrinkage of film structures of the present invention as a function of density which is effected by heat-setting the film after orientation.

Figure 2:
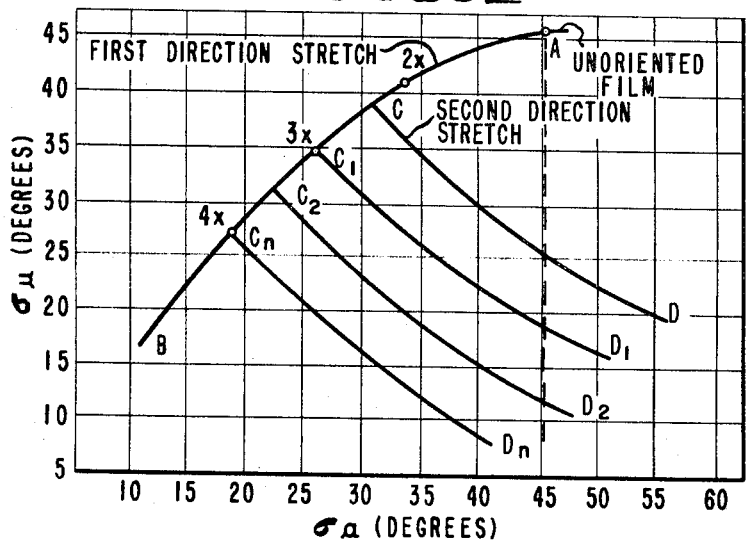

FIGURE 2 graphically illustrates the effect upon orientation of sequentially stretching a film. One locus illustrates the effect of the first direction stretching, with intersecting loci representing the effect of the second direction stretch, initiated after various degrees of stretching in the first direction, as represented by the orientation parameters $\sigma_a$ and $\sigma_u$.

FIGURE 3 graphically illustrates the enhanced pinhole flex life of film structures of the present invention.

Figure 4:
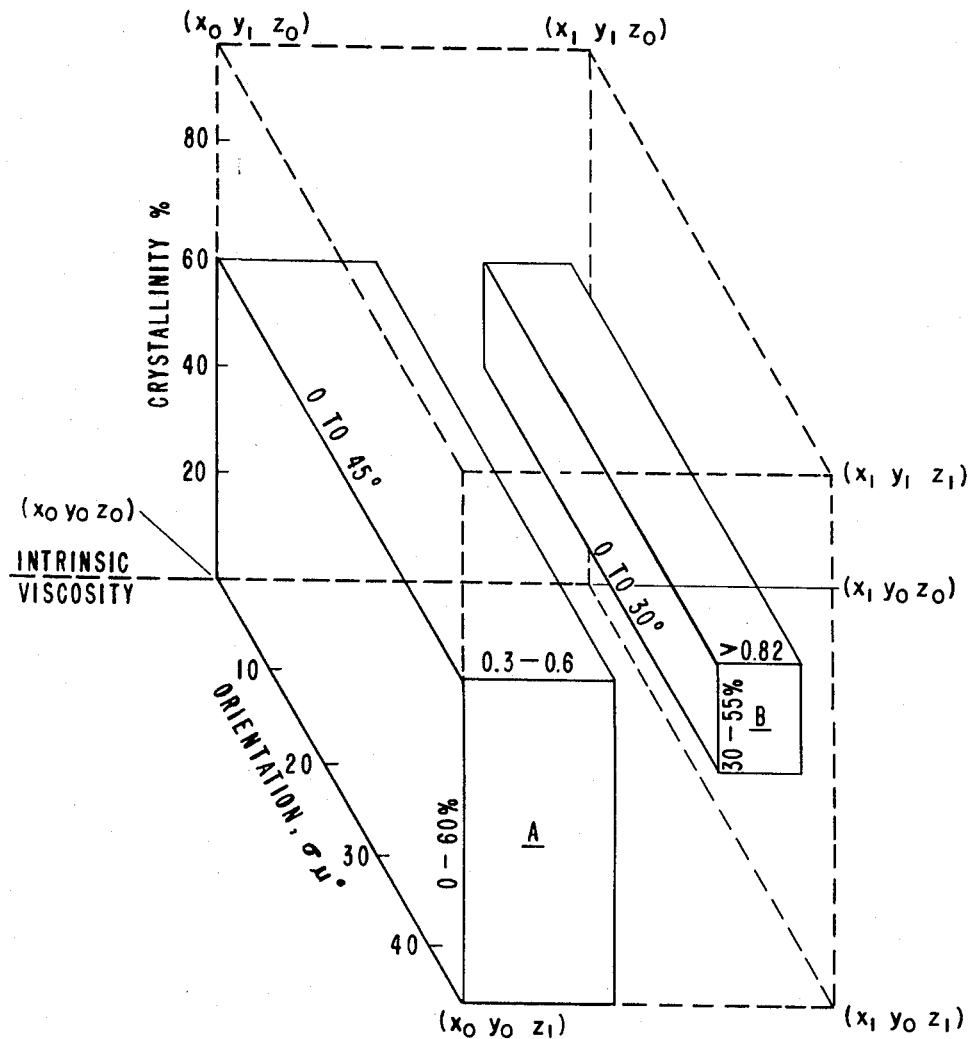

FIGURE 4 graphically illustrates the range of parameters covered by the film structures of the present invention as compared to film structures of the prior art. Depicted on orthogonal axes are the properties of intrinsic viscosity, crystallinity and orientation, which enclose and define the particular film structures.

FIGURE 5 illustrates a magnetic card structure for data processing for which the present invention fulfills a particular need.

FIGURE 6 graphically illustrates the relationship between exfoliation resistance and intrinsic viscosity.

FIGURE 7 graphically illustrates the relationship of abrasion resistance to density.

Accordingly, the term "polyethylene terephthalate" as used herein is understood to refer to polymers containing up to about 5 mol percent and preferably less than 3 mol percent of other ester-forming units. Among the other ester-forming units which may be present in these minor amounts may be mentioned diethylene glycol, other polymethylene glycols having 1 to 10 carbon atoms, hexahydro-p-xylylene glycol, other aromatic dicarboxylic acids such as isophthalic acid, bibenzoic acid and p-terphenyl-4,4'-dicarboxylic acid, cycloaliphatic acids such as hexahydroterephthalic acid, or small amounts of aliphatic acids, such as adipic acid, or a hydroxy acid such as hydroxyacetic acid.

The degree of crystallization, as manifested by density and controlled chiefly by the thermal history of the polymeric material, influences and affects the dimensional behavior of oriented film structures prepared therefrom. In fact, the degree of crystallization required of the polymeric material is largely dictated by the ultimate function and use of the film structure; for instance, an oriented film structure having low shrinkage at elevated temperatures requires a polymeric material of high crystallinity. The extent or degree of orientation in combination with crystallinity is largely governed by the uses of the film structure, such as for magnetic information storage elements which requires a high degree of toughness in combination with thermal dimensional stability (i.e., low shrinkage). The minimum intrinsic viscosity level of about 0.82 that is mentioned above is the threshold value which must be obtained in order to provide the film structure of the present invention having the combination of properties above mentioned. The upper limit of intrinsic viscosity is governed only by practical considerations such as the extent of degradation of the polymer occurring due to longer processing thereof required at higher molecular weight levels and the increased difficulty of processing the film structure at the higher intrinsic viscosity levels.

The polyethylene terephthalate of the film structure of the present invention may be prepared by two basic methods, namely, polymerization in the molten state starting from monomer which may be carried to the desired final degree of polymerization, as determined from the intrinsic viscosity of a solution of a polymer sample, or by the solid phase polymerization method in which the desired degree of polymerization is achieved by heating pulverized polymer or pre-polymer in a stream of inert gas which fluidizes the bed of solid material and carries-off products of the condensation polymerization reaction. The melt polymerization method may be adapted from the method of U.S. Patent No. 2,829,153 as modified to continue the final polymerization step beyond the usual limit of intrinsic viscosity of 0.60 or less, by continuing the condensation reaction at a temperature of 265° to 280° C. at 3 mm. or less pressure. The solid phase, fluidized bed polymerization, adapted from the method of U.S. Patent No. 2,534,028, may start from pulverized pre-polymer and proceed to the desired degree of polymerization, or it may be employed with pulverized polymer of the conventional level of an intrinsic viscosity 0.55 to 0.60, prepared by the melt method, with final polymerization achieved in the fluidized bed. In either case, the polymerization should preferably be conducted to a slightly higher viscosity than that desired in the film order to compensate for the slight degradation which occurs during processing of the film. The intrinsic viscosity values reported herein are of the finished film structure. The film structures of the present invention may be prepared from the high viscosity polymer either by melt extrusion or by pressing the solid polymer in a hydraulic press with heated platens or between heated rolls.

The film structures prepared as above described are biaxially oriented either sequentially or simultaneously to extents of stretch as known in the art, i.e., greater than 2× in mutually perpendicular directions, preferably 3× to 6×. The heat-setting of the biaxially oriented film structures is accomplished by heating the oriented film to a degree necessary to achieve the required density while holding it under restraint.

The principal properties of the film of the present invention are toughness and durability of a level and type not previously known in polyester film, and retention of physical properties over a wider temperature range than hitherto attainable with polyester film. The scope and meaning of these enhanced properties will be evident in the illustrative examples contained herein. For a more thorough understanding of the nature of the enhancement of the properties achieved by the present invention, however, it is useful to consider some of the deficiencies of prior art films of polyethylene terephthalate.

It is known that unoriented film structures of polyethylene terephthalate having even low degrees of crystallinity are so deficient in toughness that even moderate flexing thereof causes such film structures to fracture. Further, films oriented substantially in a single direction possess strength in the direction of orientation, but even at low degrees of crystallinity, such film structures are weak in the planar direction perpendicular to the direction of orientation to the extent that almost any manipulation of the film structure to fibrillate. It also is known to biaxially orient such film structures to improve the properties thereof, especially the tensile properties, e.g., strength and modulus, in each direction in the plane of the film structure. But all of these steps do little or nothing to enhance the toughness of the film structure in its third dimension, i.e., toughness through the thickness direction of the film. As a matter of fact, processes utilized to toughen the film structure in the planar direction as by biaxially stretching the film in these directions often impair and aggravate the already existing deficiency of its thickness direction toughness. The deficiency in toughness of prior art films of polyethylene terephthalate, such as films biaxially oriented by stretching in each of two perpendicular directions in the plane of the film and crystallizing by heat-setting effected by heating the film structure while holding it under restraint, is apparent in a lack of thickness direction durability as manifested by the tendency of the film to delaminate.

One application where the limitations of conventional biaxially oriented polyester film are particularly evident is its use in highly developed data processing equipment, such as apparatus manufactured by the National Cash Register Company, Dayton, Ohio, known as Series 315 (CRAM) (as described in U.S. Patent 3,238,509). This apparatus employs a magnetic card such as 10 in FIGURE 5 for data storage comprising a film structure having a magnetic coating and a series of keyhole apertures 11 therethrough of a semi-circular configuration as at 12 and having sides 13 extending to the edge of the card. The apertures are provided with tabs 14 which are useful for indexing purposes. In operation, the magnetic cards with data recorded thereon are indexed in accordance to a binary code system directly related to the presence or absence of tab portions on each of the apertures on the edge of the card; for example, if there are eight apertures, the presence or absence of the tab of each of the apertures enables 256 cards (i.e., $2^8$) to be indexed. The cards are supported by eight rotatable horizontal rods which upon rotation permit a particular card to fall from all retaining rods if the tab is absent. In searching according to the binary index code, appropriate index rods are rotated and any released card falls to a readout location where it is accelerated by air pressure at high velocity and slammed against a metal guide chute. This slamming action sets up violent wave excursions in the edges of the card, and ultimately causes the rapid exfoliation, burring or delamination of one or more of the coded apertures, thus diminishing the number of useful cycles of searching and reading the card.

According to the present invention it has been discovered that film structures of polyester polymeric material of an intrinsic viscosity (i.e., molecular weight) significantly above that employed in the prior art can be stretched sufficiently to impart high planar orientation for tensile strength, heat-set to provide crystallinity to dimensionally stabilize the film and yet provide a high resistance to delamination. Memory cards for the data processing system described which are fabricated from this film have a superior resistance to exfoliation and a greatly extended useful life.

Further, film structures produced according to the present invention, that is, of an intrinsic viscosity above a threshold which has been found to be 0.82, have an extended latitude in processing conditions such as during stretching and heat-setting while retaining their toughness, and are adaptable to other uses requiring high thickness direction durability. Especially significant is the high resistance to perforation in the form of fissures, pinholes or cracks when the film is subjected to repeated flexing. The durability property makes the novel film of the present invention especially suitable for substantially hermetic packaging of hardware and foods in which repeated flexing results from handling. The resistance to pinholing is attributed to the greater toughness, which concisely may be defined as durability in three dimensions as opposed to durability in only two (planar) directions as found in prior art film of polyethylene terephthalate.

There are applications where retention of properties at temperatures well above ordinary room temperature are important. For example, film structures are used in electric motors to insulate the windings from the stator segments therein, and under certain conditions of use the temperature of the motor rises substantially to temperatures ranging from 70°–150° C., which causes an intolerable weakening and failure by cut-through of the film insulation by the wires. It has been found that the film of the present invention possesses not only unexpected toughness at ordinary temperatures, but also unexpectedly, the toughness is maintained at elevated temperatures; that is, the percentage loss with an increment of temperature is less than film from polymer of conventional molecular weight, so that the insulation durability in electric motors is greatly extended. Another surprising attribute of the film structures of the present invention is the toughness demonstrated at cryogenic temperatures. The surprising durability and flex-life of these films at liquid hydrogen temperatures (20° K.) affords many uses for these films in applications presently unfulfilled by prior art film structures.

One of the major features of the film structures of the present invention is that operability is extended into regions of orientation inaccessible with film structures of the prior art. The film structures of the present invention may be biaxially stretched in either sequence, i.e., first in the longitudinal direction or first in the transverse direction, to more than five times its original length in each direction without difficulty caused by film breakage, provided appropriate stretching conditions are used. An attractive feature of such film is not only the high level of tensile properties afforded by the high degree of orientation, but also an equally attractive feature is the extent to which gauge uniformity of the film structure improves upon being stretched at higher stretch ratios. It is well known in the film art that initial stretching magnifies gauge non-uniformity, but that gauge uniformity starts to improve at high stretch ratio; however, limitations of prior art film did not permit full realization of the benefits of this phenomenon.

An important aspect of the present invention is that property levels which determine utility can be achieved by film structures of oriented polyethylene terephthalate that are characterized by at least three critical and essential parameters. Symbolically, this may be stated:

$$P = f([\eta], X, \sigma)$$

wherein

P = property level, e.g., exfoliation resistance, pinhole flex life, etc.
$[\eta]$ = intrinsic viscosity (greater than or equal to threshold value)
X = crystallinity (density measured)
$\sigma$ = a measure of crystallite orientation.

Critical values of these parameters have been found to be $[\eta] = 0.82$ or greater, $X = 30\%$ to $55\%$ and $\sigma$ is equal to an orientation parameter effected (to be defined) by stretching the film structure in each planar direction under orientation conditions (70 to 150° C.) to at least twice the initial planar dimensions thereof.

Orientation and crystallinity under some conditions are competitive in their contribution to certain properties. However, if the intrinsic viscosity exceeds the critical threshold value found in the present invention, then a wider latitude of values of these latter parameters can be tolerated; that is, film structures of higher orientation and high crystallinity are obtainable. Ordinarily, it is necessary to increase orientation to achieve the desired tensile strength in one or more planar directions, but if orientation is increased, thermal dimensional stability decreases. To offset the latter effect the film structure is heat-set, which, in the case of biaxially oriented film structures, decreases the durability in the thickness direction. In accordance with the present invention it has been unexpectedly discovered that film structures of intrinsic viscosity above about 0.82 are characterized by increased toughness or durability and that the weakening in the third dimension is substantially eliminated.

The specific nature and character of the present invention as above described may be better understood by reference to FIGURE 4.

FIGURE 4 graphically illustrates film of the present invention, and sets it apart from films known to the art. In FIGURE 4 there is plotted on the three orthogonal axes, intrinsic viscosity OX, percent crystallinity OY and an average angle of orientation of a specific crystallite plane to the plane of the film ($\sigma_u$) OZ. The entire range of film structures of polyethylene terephthalate is shown in FIG. 4 from intrinsic viscosity of 0.3, effectively the lowest limit, to a value of 1.0 (which is not as high as disclosed herein, but limited here for simplicity of illustration) as the parallelepiped bounded by ($X_0, Y_0, Z_0$), ($X, Y_0, Z_0$), ($X_1, Y_1, Z_0$), ($X_1, Y_0, Z_0$ . . . ($X_1, Y_1, Z_1$). Films known to the art are enclosed within the structure A, which encompasses all films above the threshold for film formation, i.e., above an intrinsic viscosity of about 0.3 and below 0.55 to 0.60, with crystallinities of zero percent (amorphous) to approximately 60%, with $\sigma_u$ from 45° (unoriented) to a maximum biaxial orientation of $\sigma_u$ approaching 0°. A substantial gap exists between films known to the art and the films of the present invention which is represented by solid structure B in FIGURE 4.

The principle and practice of the present invention will now be illustrated by the following examples which are only exemplary thereof and it is not intended that the invention be limited thereto since modifications in technique and operation will be apparent to anyone skilled in the art.

The film structures of the present invention prepared in the following examples were evaluated in accordance with the following testing procedures:

Intrinsic viscosity.—Intrinsic viscosity is customarily obtained by experimentally determined specific viscosity values at several concentrations of polymer in a suitable solvent which are plotted and the resulting curve is extrapolated to infinite dilution (zero concentration). The slope of the specific viscosity-concentration curve for polyethylene terephthalate in the solvents normally used is well known and therefore it is possible to determine the intrinsic viscosity from a single value of relative viscosity. Accordingly, it is the customary practice to measure only a single value of relative viscosity and from this value ascertain the intrinsic viscosity by referring to the standard plots thereof.

The intrinsic viscosity of polyethylene terephthalate of the present invention was determined in a trifluoroacetic acid-methylene chloride solvent system, since dissolution times are prohibitively long in the tetrachloroethane-phenol (TCEP) solvent system customarily used for conventional polyethylene terephthalate. For this determination the relative viscosity $\eta_r$ of the present polymer was determined in a 1% solution at 30° C. in a solvent system comprising 25 parts by volume trifluoroacetic acid and 75 parts by volume methylene chloride (TFAMC). The relative viscosity in this solvent (relative viscosity is the flow time of the solution through a capillary viscometer divided by the flow time of the solvent) is converted to the relative viscosity which would be obtained in a 1% solution of the conventional solvent of 60 parts by weight phenol and 40 parts by weight of sym-tetrachloroethane, by using the empirical equation $$\eta_r(TCEP) = 1.032 \eta_r(TFAMC) - 0.19$$

The intrinsic viscosity is determined by first calculating the relative viscosity from the above relationship and referring to the following experimentally constructed table:

INTRINSIC VS. RELATIVE VISCOSITY

[Polyethylene terephthalate in TCE/Phenol]

| Relative | Intrinsic | Relative | Intrinsic |
|---|---|---|---|
| 1.20 | .19 | 1.82 | .64 |
| 1.30 | .26 | 1.84 | .66 |
| 1.40 | .34 | 1.86 | .67 |
| 1.50 | .42 | 1.88 | .68 |
| 1.52 | .44 | 1.90 | .70 |
| 1.54 | .46 | 1.92 | .71 |
| 1.56 | .48 | 1.94 | .72 |
| 1.58 | .49 | 1.96 | .73 |
| 1.60 | .50 | 1.98 | .75 |
| 1.62 | .51 | 2.00 | .76 |
| 1.64 | .53 | 2.04 | .78 |
| 1.68 | .55 | 2.08 | .80 |
| 1.70 | .56 | 2.12 | .82 |
| 1.72 | .57 | 2.16 | .85 |
| 1.74 | .58 | 2.20 | .87 |
| 1.76 | .60 | 2.30 | .93 |
| 1.78 | .61 | 2.40 | .98 |
| 1.80 | .62 | 2.42 | 1.00 |

NOTE.—This table is extrapolated for relative viscosities above 2.42 (intrinsic greater than 1.00).

Alternatively, intrinsic viscosity can be determined in a solution of polyethylene terephthalate in a trifluoro-acetic-acid-methylene chloride solvent and converted to the value in tetrachloroethylene-phenol by an empirical equation obtained from multi-point viscosity determinations of film of the prior art and film of the present invention:

$$[\eta]_{TCEP} = 1.020[\eta]_{TFAMC} - 0.09$$

in which $[\eta]_{TCEP}$ = the intrinsic viscosity of polyethylene terephthalate in a solvent comprising 40 parts by weight tetrachloroethane and 60 parts by weight phenol;

$[\eta]_{TFAMC}$ = the intrinsic viscosity of polyethylene terephthalate in a solvent comprising 25 parts by volume trifluoroacetic acid, 75 parts by volume methylene chloride.

Crystallinity.—The degree of crystallinity of oriented polyethylene terephthalate film, which for technical purposes can be effectively approximated from density measurements, principally affects the property of dimensional stability of film exposed to high temperature environments, but also affects durability under certain conditions. A measure of dimensional stability is the extent of area shrinkage of a film sample heated to appropriate temperatures, e.g., 105° C., 150° C., and 200° C. Accordingly, it is desirable to thermally dimensionally stabilize the film structure at the maximum temperature to which it will be exposed. Dimensional stability as a function of density is illustrated for film samples over a wide density range in FIGURE 1.

In order to provide a tough film, it is essential not only to have crystallinity but after exceeding the viscosity threshold, to have crystallinity within a certain range. The percent crystallinity is calculated from the following equation:

$$\text{Percent crystallinity} = \frac{\rho_s - \rho_A}{\rho_c - \rho_A} \times 100$$

wherein $\rho_s$ = density of test sample, g./cm.$^3$ $\rho_A$ = 1.333 gms./cm.$^3$, density of amorphous film of zero percent crystallinity $\rho_c$ = 1.455 gms./cm.$^3$, density of the crystal calculated from unit cell parameters.

Density is not an absolute criterion for the determination of the percent crystallinity in highly oriented film structures since it is an average generated by the amount of crystallinity and the density of the amorphous material present. The amorphous density is not a constant but can vary with the amount of orientation and degree of structural relaxation. For example, it is possible in highly oriented film structures to have the apparent degree of crystallinity change by as much as 10% merely by strain relaxing the structure at a temperature below that at which additional crystallinity would occur. The values presented here are, therefore, for essentially unrelaxed film structures. The desired degree of crystallinity is achieved by heating the film after orientation to a temperature of at least 150° C. for a fraction of a second or more while holding the film under restraint. The time and temperature, as is known to those skilled in the art, should be sufficient to impart to the film the crystallinity required for the thermal dimensional stability (i.e. absence of or low shrinkage) desired at the maximum temperature to which the film will be exposed in use. Excessive crystallinity is to be avoided for films destined for some uses, since this can cause embrittlement.

Exfoliation.—The Exfoliation Test is a measure of the relative tendency of film structures to delaminate under impact. The test samples (approx. 0.005″ thick) were as shown in FIGURE 5 in the form of a rectangular card having tabs cut along one edge, and the film test samples were rigidly secured along the opposite edge in a horizontal plane. A rectangular iron bar mounted on a rotary wheel was arranged to strike the film test sample about 1″ from the edge of the tabs at a rate of 930 times per minute at a linear velocity of about 3350 ft./minute. The action of the iron bar striking the card test sample sets up violent excursions in the card tabs which causes them to delaminate. After three minutes of exposure to this treatment the film test sample is examined for delamination (exfoliation); a linear scale of 0 to 10 is employed as a measure of the extent of delamination or exfoliation across the width of the tabs on the test card. Ten represents the loss or splitting of all tabs across the entire width, and zero represents no damage. Prior art or other films have never exhibited values below 5 in this test.

A second test, the scalloped card test for exfoliation or delamination resistance also was employed. This test yielded evaluations of performance as a function of the various parameters which were comparable to evaluations by the above described tab card test. The cards in this test were of the same dimensions of length, width and thickness as in the tab card test, but instead of having the tabs along an edge, as shown in FIGURE 5, the cards of this test had scallops cut in the corresponding edge with household pinking shears. The same apparatus was used to strike the edge, but the virtue of the larger number of separate elements subjected to the damaging action of the apparatus afforded a test revealing damage over a wider numerical range of the scale of zero to ten employed in this and the tab card test. This test revealed the same relative degrees of resistance to exfoliation of various samples as did the tab card test. Card structures of polyethylene terephthalate of intrinsic viscosity of 0.60 or less have never exhibited values below 9.

Pinhole flex.—The Pinhole Flex Test is a measure of the resistance to perforation upon flexing; it is based on the method of D. W. Flierl, published in Modern Packaging, vol. 25, pages 129–130, November 1951. The higher the number of cycles before perforation the greater the durability. The specific test conditions employed herein included:

| | |
|---|---|
| Cyclic rate | 580±10 cycles/min. |
| Amplitude | .125±.005 in. |
| Pressure | Operating 6 in. water. Shut-off 3 in. water. |
| Sample | 2¼ in.×2¾ in. |
| Test cylinder | 2½ in.×0.875 in. |
| Environment | 23° C., 50% RH. |

Durability, or flex life in this test is dependent upon the thickness, therefore valid comparisons of films require that each sample be of the same thickness and of uniform thickness. (Thin films have a longer flex life.) Furthermore, other local non-uniformities, such as gel particles can cause premature failure and highly erratic results which are not truly representative of the capability of the film; such factors should be taken into consideration in comparative tests.

Vibration-abrasion.—The vibration-abrasion test consists of suspending test samples in card form in a vertical plane on cylindrical steel files disposed horizontally and passing through holes in the card. The steel files (of 5.5 mm. diameter and spaced 1 3/16 inches apart) are attached to a 60 cycle vibrator and function as parallel vibrating members that vibrate in the axial direction thereof. The resistance of the film to vibration-abrasion is indicative of the toughness of the film samples. The enlargement or increase in the size of the holes in the cards is measured at the completion of the test.

Orientation is a structural characteristic which may be utilized to impart useful physical property levels to polymeric films such as, for example, to develop useful electrical, optical and mechanical properties. Biaxial orientation of film structures may be accomplished by a variety of techniques, one of which is by stretching the film structure in both of its major planar directions either simultaneously or in sequential steps. Preferably, such stretching is carried out at a temperature above the glass transition temperature (sometimes referred to as the apparent second order transition temperature) and below the crystal melting point, and at a rate of at least 1000% per minute. The X-ray method of Heffelfinger et al., J. Applied Polymer Science 9, 2661 (1965), for determining crystallite orientation provides a measure of orientation in biaxially oriented films. The above mentioned method covers determination of the distribution of orientation of the c-axis of polyethylene terephthalate crystallites with respect to the first direction of stretch; this average value is designated as $\sigma_a$. The parameter $\sigma_u$ is a measure of the average angle of orientation of crystallite (100) planes with respect to the plane of the film. For a collection of perfectly one-way oriented crystallite c-axis $\sigma_a$ would be 0°; for an amorphous film or a film of perfectly balanced orientation, $\sigma_a$ would be 45°. Stretching in the second direction tends to pull the crystallite c-axis out of the alignment with the first direction of stretch, and distributes the alignment between the two directions. Similarly, $\sigma_u$ can vary between 0° (perfect alignment of the (100) crystallite plane with respect to the plane of the film) and 45°, a perfectly random orientation of these planes with the plane of the film. In measuring these parameters for biaxially stretched films, the incident X-ray beam is directed at the sample held in a Single Crystal Orienter according to Heffelfinger et al. (op. cit.) so that the angle between the incident and scattered radiation is 17.35° ((010) plane) for $\sigma_a$ determination and 25.75° ((100) plane) for $\sigma_u$ determination. The sample, a small stack of film prepared in a prescribed manner as described in Heffelfinger et al. (op. cit.) is rotated for the $\delta_a$ determination in a plane at a fixed angle to the incident beam, i.e., about its chi axis after having fixed the appropriate angle for the angle phi, an angle which specifies the position of the sample in a plane containing the beam and the detector. This plane is also perpendicular to the aforementioned plane at a fixed angle to the incident beam. For $\sigma_u$, the Bragg and chi angles are set appropriately, and a rotation about the phi axis is then performed. The intensities of scattered radiation are measured as a function of the angle chi or phi, as the case may be. The intensity of scattered radiation at each angle is a function of the number of elements oriented at that angle.

A plot of sigma values as a function of stretch ratio for stretching under a specific set of conditions yields a pattern as shown in FIGURE 2. Stretching along line AB in the first direction, starts from unoriented film with $\sigma_a=45°$ and $\sigma_u=45°$. The value of each of these functions decreasing with increasing uniaxial stretching. Stretching in the second direction (C, D; $C_1$, $D_1$ . . . $C_n$, $D_n$), disturbs the alignment of crystallites from their positions along the axis of the initial stretch, increasing $\sigma_a$, but continues to reduce the average angle of the crystallite (100) planes with the plane of the film, decreasing $\sigma_u$. Thus, it is seen that $\sigma_a$ and $\sigma_u$ provide a measure of the extent of crystallite orientation effected by stretching.

Example 1

Polymer was prepared by either solid phase polymerization according to Izard, U.S. Patent 2,534,028 or by continuous melt polymerization, as indicated in Table I, to produce polymer of various degrees of intrinsic viscosity. The polymer was then cast into films which were stretched biaxially in a laboratory stretcher approximately 3× x 3× or greater at a temperature of 105° C. and a stretch rate of 21,000%/minute. The films were then heat-set under restraint in frames at 200° C., for 2½ to 5 minutes.

TABLE I

| Film Preparation Method | Intrinsic Viscosity | Density, g./cc. | Pinhole Flex, cycles |
|---|---|---|---|
| I-A | 0.55-0.56 | 1.388 | 12,187 |
| I-A | 0.55-0.56 | 1.390-1.395 | 7,631 |
| I-A | 0.55-0.56 | 1.390-1.395 | 6,728 |
| II-B | 0.57-0.59 | 1.387 | 20,314 |
| I-A | 0.64 | | 16,912 |
| II-A | 0.68 | 1.388 | 33,117 |
| II-A | 0.67 | 1.386-1.388 | 173,439 |
| | 0.71 | | 79,941 |
| II-B | 0.75 | 1.384-1.386 | 277,692 |
| II-B | 0.82 | 1.380 | 177,067 |
| II-A | 0.88 | 1.382-1.384 | [1] >2,000,000 |
| II-B | 1.00 | 1.380±.007 | [1] >2,500,000 |
| II-B | 1.05 | 1.380-1.384 | [1] >2,000,000 |

[1] Test terminated with no evidence of pinhole formation.

LEGEND: I=Melt polymerization; II=Solid phase polymerization; A=Melt extruded; B=Pressed.

Example 2

Test samples of film structures were prepared as in Example 1 by melt polymerization and subjected to the Pinhole Flex Test. One test sample was prepared by melt casting and all samples were stretched sequentially in a continuous stretcher first in the longitudinal direction followed by stretching in the direction transverse thereto. All samples were heat-set at temperatures of from 190–230° C. The pertinent data as to each sample and the results of the Pinhole Flex Test are illustrated graphically in FIG. 3 in which the mean value of pinhole flex life is plotted along the ordinate and intrinsic viscosity is shown along the abscissa. In these samples crystallinity ranged from 35 to 51%, $\sigma_a$ from 39.7° to 45.7° and $\sigma_u$ from 11.0° to 23.9°.

Examples 3 to 9

Biaxially oriented, heat-set film samples of 5 mils thickness were prepared by the method indicated in Table I and subjected to the exfoliation test described hereinbefore. The pertinent data and results are shown in Table II below:

TABLE II

| Examples: | Number of Samples | Method of Preparation | Intrinsic Viscosity | Exfoliation | Density, g./cc. |
|---|---|---|---|---|---|
| 3 | 5 | I-A | 0.55 | 5.3 | 1.388-1.395 |
| 4 | 1 | I-A | 0.59 | 5.0 | |
| 5 | 2 | I-A | 0.65 | 4.9 | |
| 6 | 2 | I-A | 0.70 | 5.5 | |
| 7 | 2 | II-A | 0.83 | 3.0 | |
| 8 | 2 | II-B | 0.96 | 2.0 | |
| 9 | 5 | II-B | 1.05 | 1.1 | 1.3869 |

The foregoing results indicate an unexpected and surprising abrupt rise in durability under delamination conditions (comparable to the treatment received by magnetic record card recordings) as the intrinsic viscosity approaches 1.0.

Examples 10 to 24

A series of cards prepared from polyethylene terephthalate film samples illustrative of the prior art and film samples of the present invention of 0.005 inch thickness were subjected to the scalloped card exfoliation test to simulate the action of the record card handling apparatus of a random access memory system. The cards were prepared by notching with pinking shears along one edge, instead of the usual coding notches. A scale of 0 to 10 was employed for grading and evaluating the card samples wherein 0 represented no appreciable damage and 10 represented damage of all scallops on the edge of the test card. The pertinent data and results are indicated in Table III below and shown graphically in FIGURE 6:

TABLE III.—EXFOLIATION GRADE AS A FUNCTION OF INTRINSIC VISCOSITY

| | $[\eta]$ | Gms./cc. | $\sigma_a,°$ | $\sigma_u,°$ | Grade | Nominal Stretch Ratio |
|---|---|---|---|---|---|---|
| Example No.: | | | | | | |
| 10 | 0.56 | 1.3819 | 47 | 29 | 10+ | 3 x 3 |
| 11 | 0.56 | 1.3881 | 44 | 16 | 10+ | |
| 12 | 0.71 | 1.3796 | 43 | 18 | 10 | 3 x 3 |
| 13 | 0.72 | 1.3809 | 43 | 16 | 10 | 3.5 x 3.5 |
| 14 | 0.71 | 1.3696 | | | 9 | 3 x 3 |
| 15 | 0.82 | 1.3727 | 45 | 22 | 6.5 | 3 x 3 |
| 16 | 0.83 | 1.3816 | 41 | 22 | 5.5 | 3.5 x 3-5 |
| 17 | 0.88 | 1.3846 | 41 | 21 | 4.5 | 3.5 x 3.5 |
| 18 | 0.89 | 1.3789 | 43 | 21 | 4.0 | 3 x 3 |
| 19 | 0.89 | 1.3717 | | | 4.0 | 3 x 3 |
| 20 | 1.05 | 1.3869 | | | 2.0 | 3 x 3 |
| 21 | 1.16 | 1.3772 | 45 | 22 | 2.25 | 3 x 3 |
| 22 | 1.16 | 1.3673 | | | 2.25 | 3 x 3 |
| 23 | 1.16 | 1.3763 | 44 | 23 | 3.25 | 3.5 x 3.5 |
| 24 | 1.16 | 1.3680 | | | 3.75 | 3.5 x 3.5 |

NOTE.—All films, except that of $[\eta]=1.16$ were prepared by melt polymerization and extrusion (Method I-A), and the sample of 1.16 $[\eta]$ was prepared by solid phase polymerization and melt pressing.

As shown in FIGURE 6, the resistance to exfoliation of the film structure of the invention increases rapidly in a surprising and totally unexpected manner characterized by a marked change in the slope of the curve beginning at an intrinsic viscosity of approximately 0.82. The surprisingly increased resistance to exfoliation greatly enhances the attractiveness of the film structures of the present invention for magnetic memory devices, as well as other uses which require a film of high resistance to exfoliation or delamination.

Examples 25 to 31

A series of samples of polyethylene terephthalate films of 0.005 inch thickness and intrinsic viscosity of 0.89, having varying density were prepared by method I–A and stretched 3× x 3×. The samples were subjected to the scalloped card exfoliation test and the pertinent data and results are shown in Table IV below:

TABLE IV.—DELAMINATION GRADE AS A FUNCTION OF CRYSTALLINITY

| | Percent Crystallinity | Gm./cc. | Exfoliation Grade |
|---|---|---|---|
| Example No.: | | | |
| 25 | 32 | 1.3717 | 3.5. |
| 26 | 36 | 1.3780 | 4. |
| 27 | 44 | 1.3864 | 4. |
| 28 | 44 | 1.3870 | 6. |
| 29 | 51 | 1.3952 | 7. |
| 30 | 56 | 1.4013 | [1] Brittle fracture. |
| 31 | 55 | 1.4000 | Do. |

[1] Brittle fracture means that scallops cracked-off abruptly rather than after exfoliation.

Example 32

A base film of polyethylene terephthalate as described in Table V below was tested for resistance to abrasion and compared to a typical prior art film by forming it into a continuous loop and passing it through a magnetic recording device. After passage of separate samples for 25, 100 and 400 times, respectively, through the apparatus, the samples were metallized at a low angle with aluminum for shadowing, and examined with a microscope. The base film of the present invention shown in Table V showed substantially less abrasion as regards resistance to abrasion than the prior art film of comparable density and orientation having a lower intrinsic viscosity of about 0.56.

Samples of the film of the present invention were employed for fabrication into tapes for magnetic recording by application of a ferromagnetic coating to one surface. A coating dispersion was prepared by milling 1523 grams of ferromagnetic $CrO_2$ prepared as described in the U.S. application of Cox, Ser. No. 414,058, filed Nov. 27, 1964; 61 grams of a soya lecithin; 2305 grams of tetrahydrofuran (THF); 1631 grams of a 15% by weight THF solution of an "Estane" prepared as disclosed in column 4, lines 12–27 of U.S. Patent 2,871,218; 815 grams of a 30% by weight solution of "Saran" F220, a vinylidene chloride/acrylonitrile copolymer having an average molecular weight of about 10,000 in methyl isobutyl ketone (MIBK). The dispersion was milled for a day and the viscosity then adjusted to 12–14 poises with THF. The dispersion was then milled for several days. Thereafter, 450 cc. of THF was added and the dispersion was milled for 16 additional hours. Thereafter, 4.6 grams of stearamide, 15.0 grams of n-amyl alcohol and enough THF was added to give a total solution viscosity of 7.5 to 8 poises and the mixture was milled for an additional 24 hours. The complete mixture was again milled for at least one hour after the addition thereto of 65.0 grams of a 60% MIBK solution of a cross-linking agent prepared by reacting 2.95 mols of toluene diisocyanate with 1 mol of trimethylolpropane.

This composition was coated on the untreated bare film by the gravure method summarized in the table:

TABLE V

Base Film Description

| | |
|---|---|
| Intrinsic viscosity | 0.85 |
| Thickness inch | 0.0008 |
| Density g./cm.³ | 1.3927 |
| Stretch ratio: | |
| MD | 3.3× |
| TD | 3.3× |
| Tensile strength: | |
| MD p.s.i. | 38,600 |
| TD p.s.i. | 37,300 |

Coating

| | |
|---|---|
| Method of application | Gravure. |
| Orientation | Opposed magnets. |
| Drying temperature | 25° to 88° C. |
| Drying time | 0.4 min. |
| Calender temperature | 105° C. |
| Calender pressure | 400 lb./in. width of film. |
| Coating speed | 50 ft./min. |

Example 33

Film samples (stretched 3.15 x 3.25) three inches by eight and one-half inches having two holes each of 6.3 mm. diameter spaced 1 3/16 inches apart and 3/8 inch from one of the shorter edges were suspended by steel files passing through each of the two holes in the card and the files were set into motion to evaluate the resistance of the samples to vibration-abrasion. Tests were run for a preselected time for comparison of samples within groups of the same thickness. The increase in the size of the hole, i.e. the long axis of an ellipse, was measured at the completion of the test to determine the durability of the test sample. High density samples of polyethylene terephthalate film prepared by melt extrusion and melt polymerization showed higher resistance to abrasion, and the test results as to abrasion resistance as a function of density is shown in FIGURE 7.

Example 34

Random access memory cards of polyethylene terephthalate film prepared by melt polymerization and melt extrusion stretched 3× x 3× were fabricated and tested in the National Cash Register CRAM card handling apparatus. Separate lots of 128 cards were fabricated from prior art film and from film of the present invention at two density levels. The cards were of standard size: 3.25 inches wide, 14 inches long and 0.005 inch in thickness, and had the standard notches and tabs for binary coding along one of the shorter sides thereof. The cards were given an anti-static coating of Cabot XC72C carbon black (42% by weight in a polyester resin) to provide 0.13 mil coating on each surface thereof. The cards from the film of the present invention and from film of the prior art were marked for identification and intermixed for testing on the National Cash Register Series 315 (CRAM) apparatus in which the cards were dropped from the indexing rods through the machine 6000 times; individual cards were removed upon structural failure thereof. Comparative results are shown in Table VI below:

TABLE VI

| Card | Viscosity | Density | Crystallinity, percent | Total Number Failed Due to Tab Damage |
|---|---|---|---|---|
| Standard | 0.56 | 1.3880 | 45 | 36 |
| Sample 1 | 0.88 | 1.3755 | 35 | 2 |
| Sample 2 | 0.89 | 1.3912 | 48 | 1 |

Example 35

Cards from the film samples in Example 34 were fabricated in which the carbon coating on one surface was replaced with a ferromagnetic coating. The durability of the notches on cards from film of the present invention was superior to cards fabricated from film of the prior art.

Example 36

Exemplification of the superiority of the film structure of the present invention is dramatically illustrated in its use as slot liners for electric motors. In this use, functionality is determined by the resistance to penetration at elevated temperatures of the slot liners by wires of the motor windings, and by the capacity of the film insulation to resist shrinkage at elevated temperatures; each of the foregoing conditions can cause the motor to short-out or fail. Shrinkage of the film underlayer would permit wires to slip over the ends of the insulating film and short out the winding. A tolerable maximum is approximately 10% shrinkage at 220° C. Accordingly, the film structure must have toughness to resist penetration and sufficient chystallinity to provide the required dimensional stability. In this test, insulating layers of 10 mil film were employed as slot liners in the motors, the rotor of the motor was locked, and power was applied thereto. The temperature was allowed to increase to a predetermined level and the power was turned off and the motor allowed to cool for 10 minutes, after which the cycle was repeated to failure. Samples of prior art polyethylene terephthalate film of 0.56 intrinsic viscosity and film of the present invention of intrinsic viscosity of 0.88 were employed. Average values of a number of samples are summarized in Table VII below:

TABLE VII.—LOCKED ROTOR TEST, INTEGRAL HORSEPOWER MOTORS

| Maximum temperature, °C. | Cycles to Shorting of Motor | |
|---|---|---|
| | Prior Art Film | Present Invention |
| 250 | 4–500 | 4,300 |
| 280 | (¹) | ² 932 |

¹ Not acceptable.
² Stopped for unrelated reasons.

Example 37

The use of film structures in hermetic motors in which the electrical components are sealed in a mixture of oil and a fluorocarbon refrigerant fluid and which reach elevated temperatures in use of 150° C. is determined by resistance to shrinkage and embrittlement upon prolonged exposure to these conditions. Embrittlement was determined by the capacity for flexing over a quarter-inch mandrel without breaking or cracking. The results are summarized in Table VIII below for the film samples of Example 36.

TABLE VIII.—THE EFFECT OF HOT OIL AND FREON-22 ¹ ON AGING OF HERMETIC MOTOR INSULATION 150° C. CLOSED SYSTEM

| Time (days) | Density | |
|---|---|---|
| | Prior Art Films | Present Invention |
| 0 | Flexible | Flexible. |
| 4.7 | do | Do. |
| 6.8 | Brittle | Do. |
| 8.8 | do | Do. |

¹ Du Pont trademark.

Example 38

A foil wound transformer, having aluminum foil and film of the present invention prepared by melt polymerization and melt extrusion of polymer of intrinsic viscosity of 0.94, density 1.3863 g./cc., stretched 3.1 x 3.5 was found to have superior life when compared to a similar transformer having conventional oriented heat-set polyethylene terephthalate film of intrinsic viscosity 0.56, with comparable orientation and density.

Example 39

To illustrate the importance of crystallinity on shrinkage at elevated temperatures, samples of film structures of the present invention were heat-set at various temperatures, while holding the film under restraint, to achieve various degrees of crystallinity. Linear shrinkage was measured in each direction of the film, namely, the direction of extrusion (MD) and the direction in the plane of the film perpendicular to the direction of extrusion (TD), by freely suspending the sample in an oven at the indicated temperature. The results are indicated in Table IX and illustrated in FIGURE 1 for temperatures of 105° C., 150° C., 200° C.

TABLE IX

| | Intrinsic Viscosity | Stretch Ratio | Density, g./cc. | Percent Shrinkage Percent TD+Percent MD / 2 | | |
|---|---|---|---|---|---|---|
| | | | | 105° C. | 150° C. | 200° C. |
| Sample No.: | | | | | | |
| 1 | 0.865 | 2.85 x 2.85 | 1.3730 | 1.4 | 10.2 | 22.8 |
| 2 | 0.865 | 3.1 x 2.85 | 1.3725 | 1.3 | 10.8 | 23.1 |
| 3 | 0.865 | 3.1 x 2.85 | 1.3864 | 0.9 | 2.0 | 5.7 |
| 4 | 0.865 | 2.85 x 2.85 | 1.3867 | 0.8 | 1.9 | 5.0 |
| 5 | 0.90 | 3.15 x 3.15 | 1.3701 | 1.9 | 13.9 | 27.7 |
| 6 | 0.90 | 3.15 x 3.15 | 1.3700 | 1.8 | 13.0 | 26.8 |
| 7 | 0.90 | 3.15 x 3.15 | 1.3738 | 1.8 | 11.3 | 24.2 |
| 8 | 0.90 | 3.15 x 3.15 | 1.3754 | 1.7 | 9.0 | 23.5 |
| 9 | 0.91 | 3.25 x 3.25 | 1.3883 | 0.8 | 2.1 | 5.6 |
| 10 | 0.91 | 3.25 x 3.25 | 1.3854 | 0.9 | 2.9 | 8.2 |
| 11 | 0.91 | 3.25 x 3.25 | 1.3775 | 1.2 | 5.7 | 16.3 |
| 12 | 0.91 | 3.25 x 3.25 | 1.3713 | 1.6 | 12.4 | 26.7 |

Example 40

Film samples representative of the present invention of intrinsic viscosity greater than 0.82 and control film samples not of the invention of intrinsic viscosity below 0.82 were prepared in identical manner under ordinary production conditions. All film samples were biaxially stretched first in the longitudinal direction and then in the transverse direction. The control film samples could not be stretched as much as the film samples representative of the invention because the samples of the control film broke and could not be stretched in the transverse direction if the stretching thereof in the longitudinal direction exceeded about 4×. Film 2 illustrates this limitation in Table X below which shows the results of each test sample.

TABLE X

|  | Film number | | |
| --- | --- | --- | --- |
|  | Film 1 | Film 2 | Film 3 |
| Intrinsic Viscosity | 0.9 | 0.7 | .54 |
| Stretch Ratio, LD | 4.3 | 4.3 | 3.3 |
| Stretch Ratio, TD | 5.8 | (²) | 3.8 |
| Modulus, Kp.s.i., LD | 700 | --------- | 600 |
| Modulus, Kp.s.i., TD | 700 | --------- | 600 |
| Tensile Str., Kp.s.i., LD | 40 | --------- | 25 |
| Tensile Str., Kp.s.i., TD | 44 | --------- | 31 |
| Elong. percent, LD | 60 | --------- | 120 |
| Elong. percent, TD | 50 | --------- | 95 |
| $F_5$, Kp.s.i.,¹ LD | 16 | --------- | 14 |
| $F_5$, Kp.s.i.,¹ TD | 17 | --------- | 14 |
| Percent Shrinkage 105° C., LD | 1.1 | --------- | 0.6 |
| Percent Shrinkage 105° C., TD | 1.7 | --------- | 0.8 |

¹ The $F_5$ value is described in U.S. Patent 3,165,499 as the tensile strength at 5% elongation.
² The film of 0.70 intrinsic viscosity could not be stretched to 5.8× after a first direction stretch of 4.3.

It is important to recognize that in many uses the correct combination of properties is the requirement for functionality.

As shown in the foregoing, it is possible by the present invention to produce tough durable films characterized by a minimum critical level of intrinsic viscosity, orienting the film sufficiently to have both high strength and toughness, and crystallizing to an extent to provide thermal dimensional stability, but not to produce a brittle structure. This latter necessity is a severe restriction to the utility of films in many applications because it has been shown that too low a crystallinity (density) leads to high shrinkage or loss of certain other desirable properties while too high a crystallinity results in loss of toughness. Therefore, the films of the present invention encompass not only the critical minimum of molecular weight, but also a degree of orientation and crystallinity necessary to satisfy the criteria of high in-plane strength, thickness direction toughness, durability and abrasion resistance coupled with dimensional stability at elevated temperatures. Such film is characterized as a durable and dimensionally stable film, having a minimum intrinsic viscosity in 40/60 TCE/phenol of 0.82, a density between the limits of 1.370–1.400, a crystallite orientation distribution of $\sigma_a$ between the limits of 30–60° and $\sigma_u$ less than 30°.

In the present invention, a highly surprising and unexpectedly durable polyethylene terephthalate film has been obtained; this novel film unexpectedly and surprisingly possesses toughness in three dimensions. Presently available oriented polyethylene terephthalate films are strong and tough in two dimensions but suffer from certain weaknesses in the thickness direction. It has now been discovered that a polyethylene terephthalate film with three-dimensional toughness can be produced by the above-described unique combination of parameters. Such films have been shown hereinabove to possess a great utility over a broad range of temperatures.

What is claimed is:

1. A durable self-supporting film structure comprising a biaxially oriented, heat-set film of polyethylene terephthalate having an intrinsic viscosity greater than 0.82 and characterized by a density between about 1.370 and about 1.400 and an angle of orientation of the long axis of crystallites between about 30° and 60° with respect to the direction of principal orientation and an angle of orientation of the (100) crystallite planes of less than about 30° with respect to the plane of said film structure.

2. The film of claim 1 having coating on at least one side thereof.

3. The film of claim 2 having a coating of a composition containing magnetizable particles.

References Cited

UNITED STATES PATENTS

| 2,534,028 | 12/1950 | Izard | 260—75 |
| 2,995,779 | 8/1961 | Winter | 264—210 |
| 3,150,995 | 9/1964 | Bauer | 117—138.8 |
| 3,161,710 | 12/1964 | Turner | 260—75 |
| 3,165,499 | 1/1965 | Alles | 264—289 |
| 3,177,277 | 4/1965 | Adams et al. | 264—210 |
| 3,216,187 | 11/1965 | Chantry et al. | |

FOREIGN PATENTS 138,328   8/1950   Australia.

JULIUS FROME, *Primary Examiner.*

H. MINTZ, *Assistant Examiner.*

U.S. Cl. X.R.

260—75; 117—138.8, 7